(12) United States Patent
Fan et al.

(10) Patent No.: US 11,554,529 B2
(45) Date of Patent: Jan. 17, 2023

(54) MICROWAVE-COUPLED 3D PRINTING SYSTEM AND EQUIPMENT FOR FOOD DESIGN AND PRODUCTION

(71) Applicant: Jiangnan University, Wuxi (CN)

(72) Inventors: Daming Fan, Wuxi (CN); Zilong Zhao, Wuxi (CN); Bowen Yan, Wuxi (CN); Wenhua Gao, Nanjing (CN); Jianlian Huang, Xiamen (CN); Huayu Yang, Wuxi (CN); Hao Zhang, Wuxi (CN); Jianxin Zhao, Wuxi (CN); Wei Chen, Wuxi (CN)

(73) Assignee: Jiangnan University, Wuxi (CN)

( * ) Notice: Subject to any disclaimer, the term of this patent is extended or adjusted under 35 U.S.C. 154(b) by 55 days.

(21) Appl. No.: 17/032,468

(22) Filed: Sep. 25, 2020

(65) Prior Publication Data
US 2021/0008787 A1    Jan. 14, 2021

(30) Foreign Application Priority Data

Jan. 17, 2020    (CN) .......................... 202010051456.6

(51) Int. Cl.
  *B29C 64/106*    (2017.01)
  *B29C 64/268*    (2017.01)
  (Continued)

(52) U.S. Cl.
  CPC .......... *B29C 64/106* (2017.08); *B29C 64/295* (2017.08); *B29C 64/209* (2017.08); *B33Y 30/00* (2014.12)

(58) Field of Classification Search
  CPC ... B29C 64/106; B29C 64/295; B29C 64/209; B29C 64/00; B33Y 10/00; B33Y 30/00; B33Y 80/00; A23L 5/34; A23P 30/20
  See application file for complete search history.

(56) References Cited

U.S. PATENT DOCUMENTS

| 2015/0273766 A1* | 10/2015 | Denda .................. B29C 64/129 264/483 |
| 2015/0321419 A1* | 11/2015 | Linthicum ............ B29C 64/118 425/375 |

(Continued)

FOREIGN PATENT DOCUMENTS

| CN | 205341923 U | * | 6/2016 |
| CN | 205341923 U | | 6/2016 |

(Continued)

OTHER PUBLICATIONS

Guo et al., Google Translate of CN-205341923-U (Year: 2016).*
Chen et al., EPO Machine Translation of CN-109537455-A (Year: 2019).*

*Primary Examiner* — Seyed Masoud Malekzadeh
*Assistant Examiner* — John W Hatch
(74) *Attorney, Agent, or Firm* — IPro, PLLC; Na Xu

(57) ABSTRACT

Disclosed are 3D printing equipment, a system, and a method for food design and production. The 3D printing equipment has a bipolar microwave heating antenna for focusing heating on a material in an extrusion nozzle. The extrusion nozzle is between the anode antenna and the cathode antenna of the bipolar microwave heating antenna. The anode antenna and the cathode antenna limit a microwave electric field between them, thereby implementing focused heating on the material.

6 Claims, 19 Drawing Sheets

(51) Int. Cl.
 *B33Y 30/00* (2015.01)
 *B29C 64/209* (2017.01)
 *B29C 64/295* (2017.01)

(56) References Cited

U.S. PATENT DOCUMENTS

2018/0184550 A1\* 6/2018 Jenkins .................. H05K 1/115
2018/0354034 A1\* 12/2018 Vaes ...................... B33Y 50/02
2019/0115278 A1\* 4/2019 Greenhill ............ H01L 23/3737
2019/0262901 A1\* 8/2019 Huebinger ............ B29C 64/153

FOREIGN PATENT DOCUMENTS

| CN | 109363221 A | | 2/2019 | | |
|----|----|----|----|----|----|
| CN | 109537455 A | \* | 3/2019 | | |
| CN | 109820224 B | | 7/2020 | | |
| DE | 102017217122 A1 | \* | 3/2019 | ............. | B33Y 10/00 |
| FR | 1428286 A | \* | 3/1966 | ............. | B29C 35/10 |
| KR | 20140001287 A | \* | 1/2014 | | |

\* cited by examiner

MICROWAVE-COUPLED 3D PRINTING SYSTEM AND EQUIPMENT FOR FOOD DESIGN AND PRODUCTION

TECHNICAL FIELD

The present invention relates to a microwave-coupled 3D printing system and equipment for food design and production, and belongs to the field of food technology.

BACKGROUND 3D printing is an additive manufacturing technology, and is different from traditional subtractive manufacturing such as lathing and carving. Based on instructions of a control system, parts are manufactured through layer-by-layer superposition. In recent years, the 3D printing technology has quickly developed in the industrial field and has been widely studied and applied. In the food field, because most of systems have relatively much moisture, foods are mainly modeled by using a fused deposition modeling (Fused Deposition Modeling, FDM) technology during 3D printing. Generally, a food material is made into a fused state or a slurry, and is placed in an extrusion charging barrel. The food slurry is extruded from the charging barrel through extrusion of a piston, air or a screw, and is deposited on a printing platform. Food such as chocolate, cheese and sugar have a relatively low melting point. After being extruded, a slurry is solidified and modeled. The solidified slurry has high mechanical strength. Therefore, a 3D printing molding quality of such food is relatively desirable.

Relatively speaking, after being extruded, a high-moisture food slurry such as surimi, meat paste or dough is still in a flowing state with low mechanical strength, and is easy to flow or collapse, leading to a relatively poor molding quality. Therefore, such food is mostly used for manufacturing structures with weak three-dimensionality such as two-dimensional structure and simple non-hollow shapes. In addition, such a food slurry is not cooked before being printed, and a modeled product cannot be eaten directly. At present, a solution to printing first and then cooking is mainly used, but a product is extremely easily deformed during heating, and it is difficult to maintain an original shape.

Because a high-moisture food slurry such as surimi, meat paste or dough is heated to transit from a flowing state to a solidified state, in order to resolve a problem of relatively poor molding quality of the food slurry, a series of heated 3D printers have attracted widespread attention from researchers. In a disclosed 3D printing apparatus (CN 201610864170.3) for heated food, an electric heating tube is disposed at a bottom portion of a raw material barrel, and a solid state raw material in the barrel are melted into a liquid state by using a heat conduction block, and is then output by a printing head. In a process of 3D printing for food, in order to increase printing precision, a diameter of the extrusion head of a 3D printer is generally only about 1 mm to 2 mm, and a material extrusion speed reaches tens of millimeters per second. In addition, a material has certain heat transmission resistance. Therefore, it may be very difficult to uniformly heat, by using the electric heating tube, a food slurry such as surimi, meat paste or dough that is extruded at a high speed.

A disclosed 3D printer for making pancakes (CN 201720021832.0) adopts a method for installing a heating plate on a printing platform to heat extruded materials. However, because 3D printing is a process of layer-by-layer deposition, this type of heating manner may causes a material deposited first on the printing platform to be overheated, and a material deposited later to be heated insufficiently, resulting in non-uniform heating of a product. In addition, the material has certain heat conduction resistance. Therefore, it is also difficult to heat a product with a certain height or thickness completely in such a heating manner.

A disclosed microwave heating mechanism for 3D printing (CN 201711206387.6) generates a microwave through a magnetron, limits a heating range of the microwave by using upper and lower microwave shielding frames, and heats extruded plastic and metal melting wire, to keep the material fused, thereby facilitating molding. However, the microwave is scattered, refracted and dissipated in the air. Therefore, it cannot be ensured that the microwave can act on the extruded material with uniform and sufficient energy, causing a food material to be non-uniformly heated, resulting in non-uniform texture of a final product. In addition, the microwave is reflected and scattered in a printing cavity, and is difficult to target the extruded material, thereby causing a product already deposited on the printing platform to be excessively heated.

In a disclosed microwave-coupled 3D printing method and printer for food (CN 201910089465.1), a microwave heating probe embedded in an inner wall of a charging barrel releases a microwave at a head, and an instant heating effect of an extruded material is achieved with a non-wave-absorbing material. The microwave heating probe includes a coaxial line. However, in this equipment, a distance between the head of microwave heating probe and the extrusion head needs to be calculated according to a dielectric property of the material. It is tedious to replace the heating probe when different materials are to be printed. Through finite element simulation, it is found that the microwave electric field with such a heating manner is mainly concentrated near the head of the heating probe, and it is difficult to effectively heat the extruded material.

Therefore, there is an urgent need to develop a 3D printing technology with the function of rapid, uniform, and focused heating for extruded materials. Which can improve the mechanical strength of an extruded material and molding quality of products through immediate solidification when surimi and other materials are extruded. In this way, a structure with a strong three-dimensionality will be manufactured.

SUMMARY

In order to resolve the problem that slurries such as surimi, meat paste and dough are lacking in mechanical strength after being extruded in 3D printing process, unable to print complex shapes with strong three-dimensionality, and even products flowing and collapsing after extrusion. The present invention provides a microwave-coupled 3D printing system and equipment for food design and production.

The first objective of the present invention is to provide microwave-coupled 3D printing equipment for food, where the microwave-coupled 3D printing equipment for food includes focused heating unit and extrusion unit, where the focused heating unit includes a microwave cavity and a microwave heating antenna, where the microwave heating antenna is a bipolar antenna, and includes an anode antenna and a cathode antenna, and the anode antenna and the cathode antenna are disposed inside the microwave cavity; and the material extrusion unit includes a charging barrel and an extrusion nozzle; the extrusion nozzle is disposed between the anode antenna and the cathode antenna, and microwave electric field is limited between the anode antenna and the cathode antenna, thereby implementing concentrated heating on extruded materials, and achieving solidification immediately after extrusion.

Optionally, the anode antenna and the cathode antenna are arranged symmetrically on both sides or spirally arranged.

Optionally, the anode antenna and the cathode antenna are metal wires or plates.

Optionally, the microwave-coupled 3D printing equipment for food further includes: microwave generator, microwave transmission line and microwave adapter; the microwave generator generates microwave, and transmits the microwave to the microwave heating antenna by using the microwave adapter and the microwave transmission line.

Optionally, the microwave transmission line is a coaxial line, and the anode antenna and the cathode antenna are respectively connected to the internal conductor and the external conductor of the coaxial line, to form the bipolar antenna.

Optionally, the anode antenna and the cathode antenna are made of metal that has conductivity but has no wave-absorbing capability.

Optionally, the microwave heating cavity is located at a bottom portion of the charging barrel, and the two parts are of integrated structure.

Optionally, when the anode antenna and the cathode antenna are arranged symmetrically on both sides, the center axis of extrusion nozzle is located at a line of symmetry between the anode antenna and the cathode antenna.

Optionally, when the anode antenna and the cathode antenna are spirally arranged, a center axis of the extrusion nozzle coincides with a center axis of a spiral formed by the anode antenna and the cathode antenna.

Optionally, when the anode antenna and the cathode antenna are arranged in the form of electrode plates, a center axis of the extrusion nozzle is located at a center of symmetry between parallel ends of the two electrode plates of the anode antenna and the cathode antenna.

Optionally, the microwave-coupled 3D printing equipment for food can be applied to the high-moisture food slurry. The high-moisture food slurry is in a flowing state at normal temperature when heated to a certain temperature, phase change is performed on it to a solidified state.

The second objective of the present invention is to provide a microwave-coupled 3D printing system for food, where the microwave-coupled 3D printing system for food includes scanning and imaging unit, control unit, focused heating unit and 3D printing unit. The control unit is separately connected to the scanning and imaging unit, the focused microwave heating unit, and the 3D printing unit. The control unit obtains image information which has been sliced by slicing software of a to-be-printed object by using the scanning and imaging unit. Then, the 3D printing unit to perform 3D printing according to the image information. The switch of the microwave generator based on whether the 3D printing unit extrudes materials, to ensure that the material is uniformly heated.

The focused heating unit includes a microwave cavity and microwave heating antenna. The microwave heating antenna is a bipolar antenna which disposed inside the microwave heating cavity, and includes an anode antenna and a cathode antenna.

The 3D printing unit includes a charging barrel and an extrusion nozzle. The extrusion nozzle is disposed between the anode antenna and the cathode antenna. The microwave electric field is limited to between the anode antenna and the cathode antenna, thereby extruded materials can be focused heating and solidify instantly after extrusion. Optionally, the focused microwave heating unit further includes: microwave generator, microwave transmission lines and microwave adapters. The microwave generator is configured to: generate microwave, and transmit the microwave to the microwave heating antenna by using the microwave adapter and the microwave transmission line. The microwave transmission line is a coaxial line. The anode antenna and the cathode antenna are respectively connected to an internal conductor and an external conductor of the coaxial line, to form the bipolar antenna.

Optionally, the 3D printing unit further includes X-axis guide rail, Y-axis guide rail, Z-axis guide rail and a printing platform that are used for implementing relative 3D movement on a charging barrel, and a stepper motor and an extrusion screw that are configured to perform material extrusion.

Optionally, the focused heating unit further includes a temperature sensor. The temperature sensor is located in a metal wall of a bottom surface of the microwave cavity, and the head of it is in close contact with a wall of the exit end of the extrusion nozzle.

Optionally, the temperature sensor is connected to the control unit by using a temperature sensing wire.

Optionally, the microwave-coupled 3D printing system for food further includes a leakage prevention unit which is configured to prevent a microwave from being leaked.

The third objective of the present invention is to provide a microwave-coupled 3D printing method for food, where the foregoing microwave-coupled 3D printing equipment for food prints a 3D food shape by using the method. The method guides the focused heating unit and the 3D printing unit to perform 3D printing layer by layer. When one layer is printed, the axis Z remains unchanged, the axis X and the axis Y moves based on an instruction of the control unit. The stepper motor controls the extrusion screw to extrude materials which are heated by a microwave heating antenna in extrusion nozzle and deposited on a printing platform after being extruded. After printing one layer of materials is completed, the charging barrel rises to a height along the axis Z for printing of the next layer. The microwave heating antenna which is fixed on the charging barrel also rises to a height to heat the next layer of extruded materials. After the whole printing is completed, each component returns to the origin, printing system off.

The fourth objective of the present invention is to provide an integrated microwave-coupled 3D printing method for food. The foregoing microwave-coupled 3D printing system for food prints a 3D food shape by using the method. This method includes the following steps. First, obtaining, by the scanning and imaging unit which controlled by control unit, image information of a to-be-printed object. Then, performing slicing processing on the image information of the to-be-printed object through slicing software, to obtain slicing information. Last, controlling, in real time based on the slicing information, the 3D printing unit to perform 3D printing on the to-be-printed object. Meanwhile, controlling switch of microwave generator based on whether the 3D printing unit extrudes a material, to ensure uniform heating.

Beneficial effects of the present invention are as follows:

The present invention provides a microwave-coupled 3D printing system and equipment for food design and production, to greatly improve feasibility of 3D printing of food materials with high-moisture content. The focused heating on the materials in an extrusion nozzle is implemented by the bipolar microwave heating antenna is disposed. In addition, the bipolar microwave heating antenna breaks through traditional multi-mode cavity heating manners, thereby greatly reducing a heating cavity volume and facilitating integration with a desktop 3D printer. The switch of microwave generation is controlled by extrusion instruction to achieve synchronization between extrusion and heating, and improve heating uniformity. The processes of model making, slicing, and 3D printing are integrated through joint operations of a 3D scanner, slicing software, and a 3D printer. The microwave-coupled 3D printing system and method for food provided by the present invention can make the materials solidify instantly after extrusion by quickly heat the material in the extrusion nozzle in a concentrated manner. So that the extruded materials have high mechanical strength, thereby improving molding quality and effectively resolving the problems of deformation, collapse, and the like of the products.

BRIEF DESCRIPTION OF FIGURES

In order to more clearly describe the technical solutions of the embodiments of the present invention, the accompanying drawings required to describe the embodiments are briefly described below. Apparently, the accompanying drawings described below are only some embodiments of the present invention. Those of ordinary skill in the art may further obtain other accompanying drawings based on these accompanying drawings without inventive effort.

FIG. 14A is a structural diagram of a charging barrel of the three-dimensional printer coupled with microwave for food according to this application, FIG. 14B is an enlarged view of a portion of FIG. 14A, FIG. 14C is a schematic diagram of temperature distribution when the value d is 2 mm in the heating mode, and FIG. 14D is a schematic diagram of electric field distribution when the value d is 2 mm in the heating mode;

FIG. 15A is a schematic diagram of temperature distribution when the value d is 4 mm in the heating mode according to this application, and FIG. 15B is a schematic diagram of electric field distribution when the value d is 4 mm in the heating mode;

FIG. 16A is a schematic diagram of the heating mode that is the same as the microwave cavity of the present invention, but that performs heating by using only the coaxial line, FIG. 16B is a schematic diagram of distribution of corresponding temperature, and FIG. 16C is a schematic diagram of distribution of a corresponding electric field;

FIG. 17A is a schematic diagram of the microwave cavity using the spirally arranged microwave heating antennas according to the present invention, FIG. 17B is a schematic diagram of distribution of corresponding temperature, and FIG. 17C is a schematic diagram of distribution of a corresponding electric field, where a microwave heating probe 39 and an extrusion head 40 are included in the application entitled A THREE-DIMENSIONAL PRINTER COUPLED WITH MICROWAVE AND PRINTING METHOD APPLIED FOR FOOD DESIGN with the application number of CN 201910089465.1.

DETAILED DESCRIPTION

The implementation manners of the present invention are described below in detail with reference to the accompanying drawings to make the purpose, technical solutions, and advantages clearer.

Example 1

Figure 1:
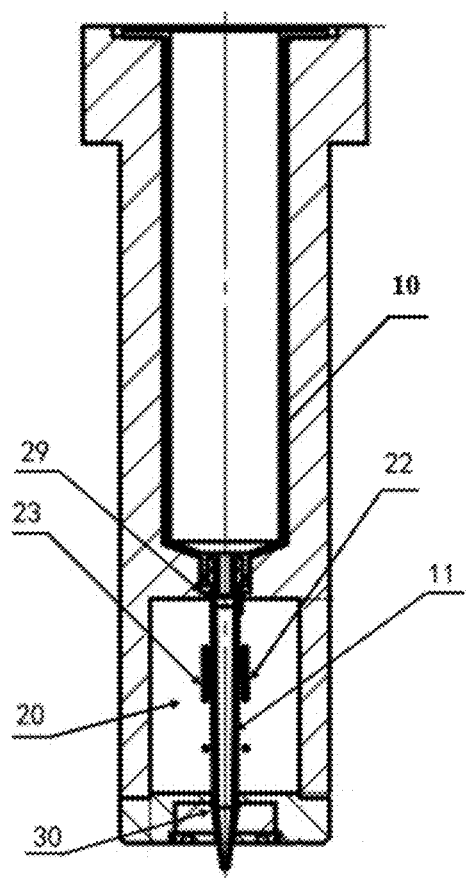
FIG. 1 is a sectional diagram of a plane of a charging barrel according to the present invention.
Figure 2:
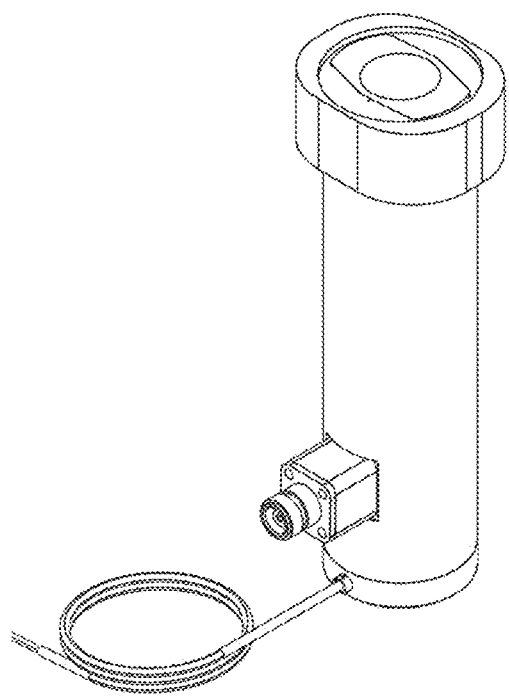
FIG. 2 a schematic diagram of the connection between coaxial line, cathode antenna and anode antenna in the heating cavity according to the present invention.
Figure 3:
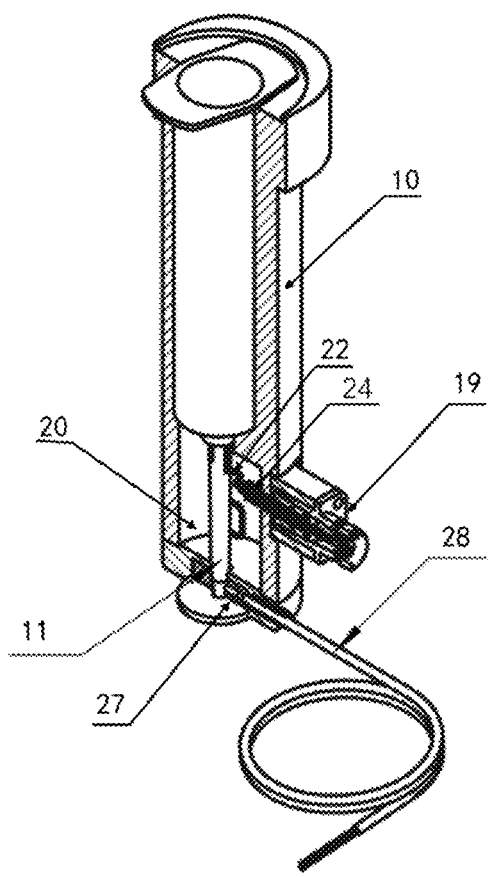
FIG. 3 is a 3D diagram of a charging barrel according to the present invention.

This example provides the microwave-coupled 3D printing equipment for food. As shown in FIG. 1 to FIG. 3, the microwave-coupled 3D printing equipment for food includes the focused heating unit and the material extrusion unit. The focused heating unit includes the microwave cavity 20 and the microwave heating antenna 21, the microwave heating antenna 21 is a bipolar antenna, and includes the anode antenna 22 and the cathode antenna 23 that are disposed inside the microwave heating cavity 20.

The material extrusion unit includes the charging barrel 10 and the extrusion nozzle 11. The extrusion nozzle 11 is disposed between the anode antenna 22 and the cathode antenna 23. The microwave electric field is limited between the anode antenna 22 and the cathode antenna 23 to implement the focused heating on the extruded materials, thereby achieving instantly solidifying of the extruded materials. The microwave-coupled 3D printing equipment for food provided by this application can perform microwave heating on the materials being extruded to achieve molding and instantly solidifying, especially when the material is a high-moisture food slurry such as surimi, minced meat, or dough. And resolve the problem that 3D printed products are easily deformed and collapses when such materials are printed.

The focused heating unit further includes: the microwave source 14, microwave transmission line 17 and microwave adapter. The microwave generated by the microwave generator 14 goes through the first microwave adapter 18 and the microwave transmission line 17 in turn, and is introduced into the microwave heating antenna 21 through the second microwave adapter 19 on the wall of the microwave cavity 20.

Figure 4:
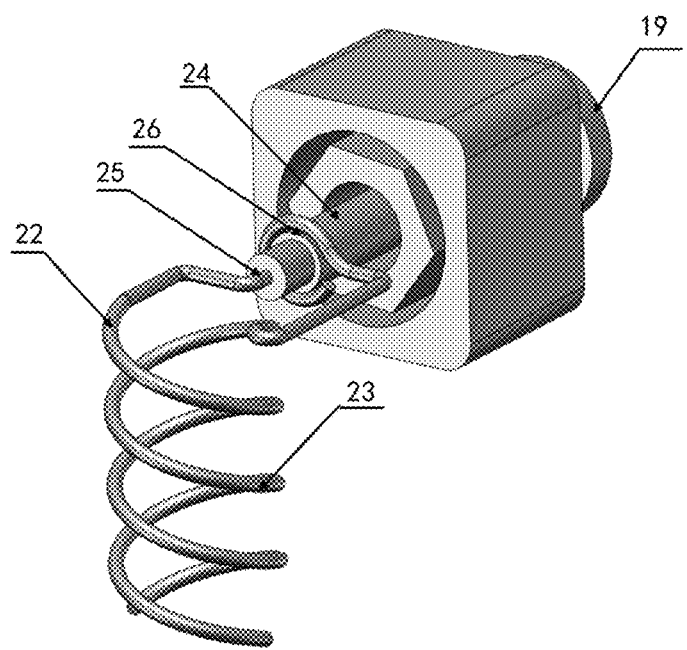
FIG. 4 is a 3D sectional diagram of a charging barrel according to the present invention.

The microwave transmission line 17 is a coaxial line which includes two coaxial cylindrical conductors, and air or a wideband microwave transmission line with a high-frequency dielectric is filled between the internal conductor and external conductor. The anode antenna 22 is connected to an internal conductor 25 of a coaxial line 24 built in the second microwave adapter 19, and the cathode antenna 23 is connected to the external conductor 26 of the coaxial line 24 built in the second microwave adapter 19, shown in FIG. 4.

The microwave cavity 20 is located at a bottom portion of the charging barrel 10 and is integrated with the it.

The material extrusion unit further includes a stepper motor 12 and an extrusion screw 13 that are configured to extrude the materials from the charging barrel 10.

The microwave heating antenna 21 uses the bipolar antenna design that can limit the microwave electric field between the anode antenna 22 and the cathode antenna 23, so that intensity of the microwave electric field in the microwave heating antenna 21 a is stronger than that in another area in the microwave cavity 20, so as to play a role of focused heating.

As shown in FIG. 5 to FIG. 11, the anode antenna 22 and the cathode antenna 23 of the microwave heating antenna 21 are arranged symmetrically on both sides or spirally arranged. The anode antenna 22 and the cathode antenna 23 have a plurality of forms, such as the spiral type, bilateral symmetrical type and electrode plate type.

Figure 5:
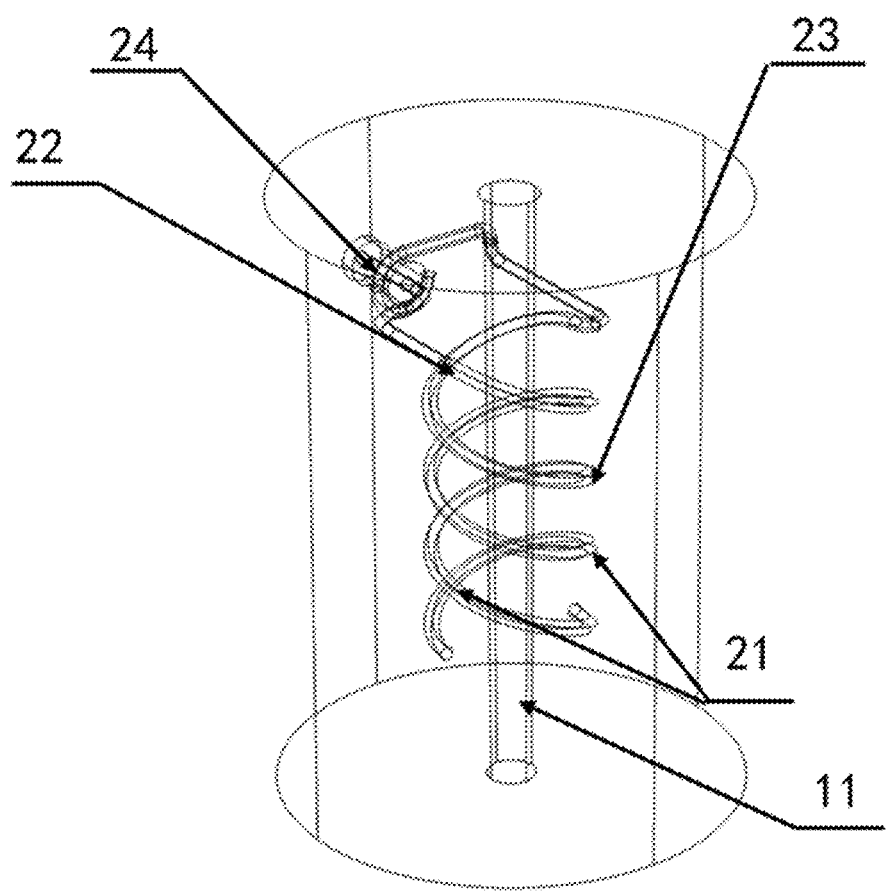
FIG. 5 to FIG. 11 are 3D perspective views of various arrangement forms of bipolar microwave heating antennas according to the present invention.
Figure 6:
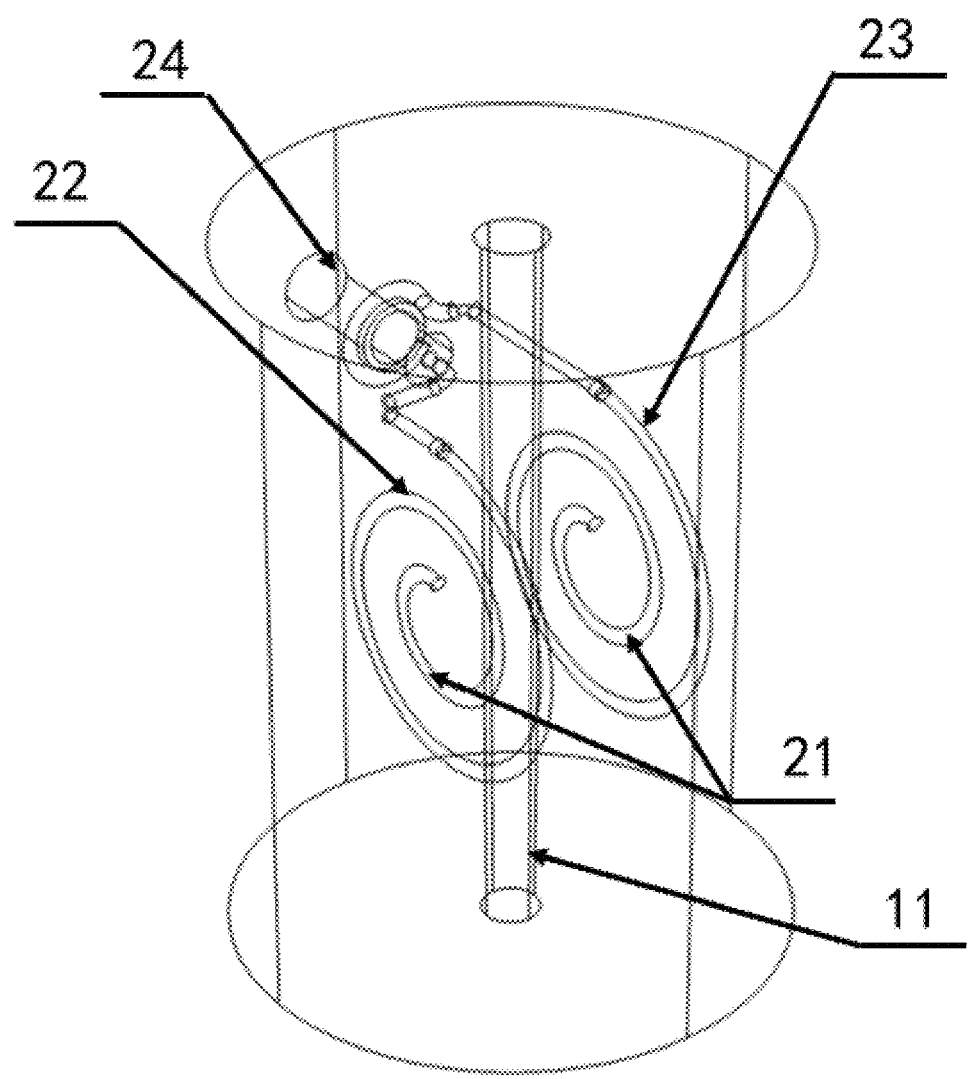
Figure 7:
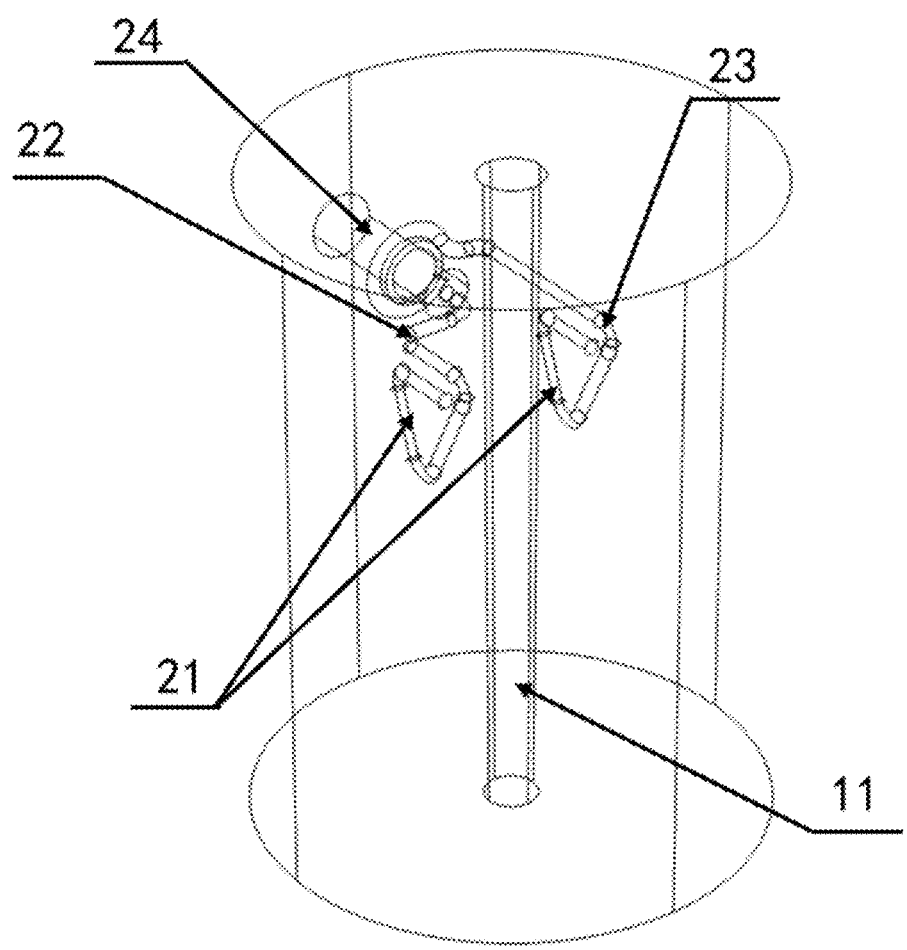
Figure 8:
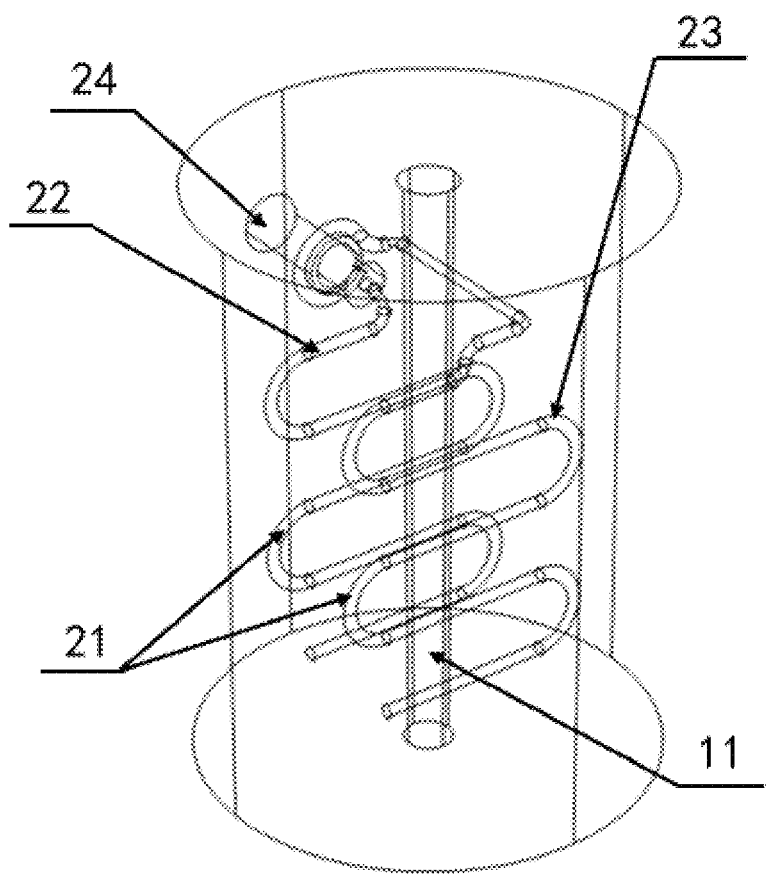
Figure 9:
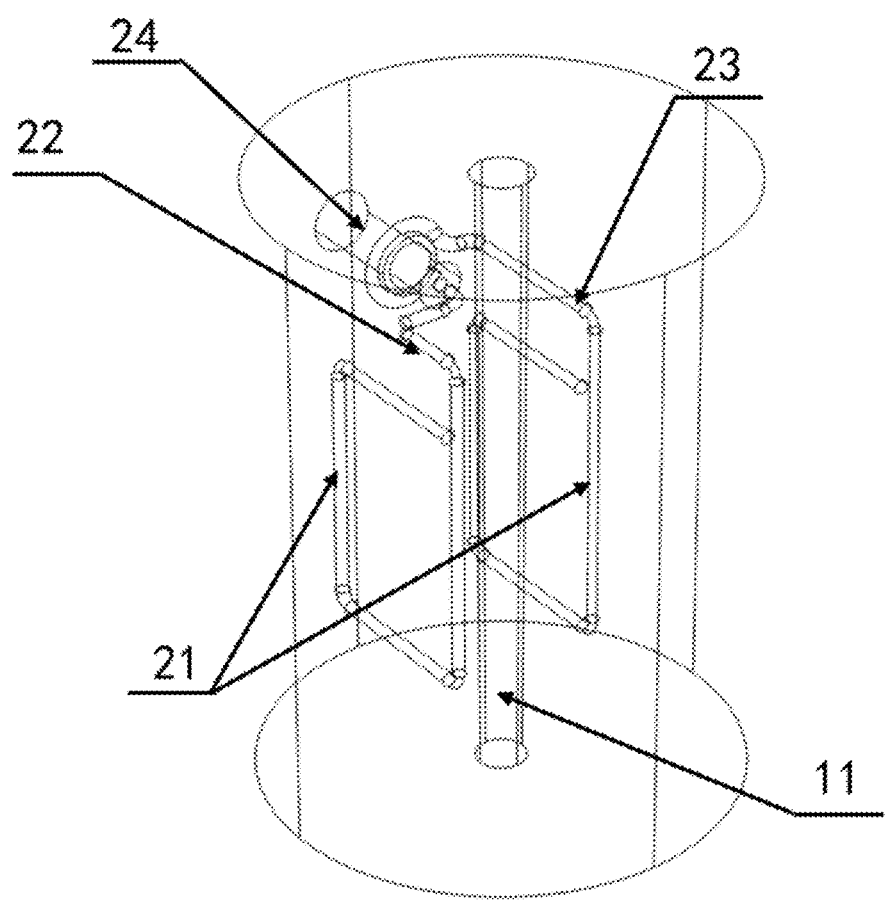
Figure 10:
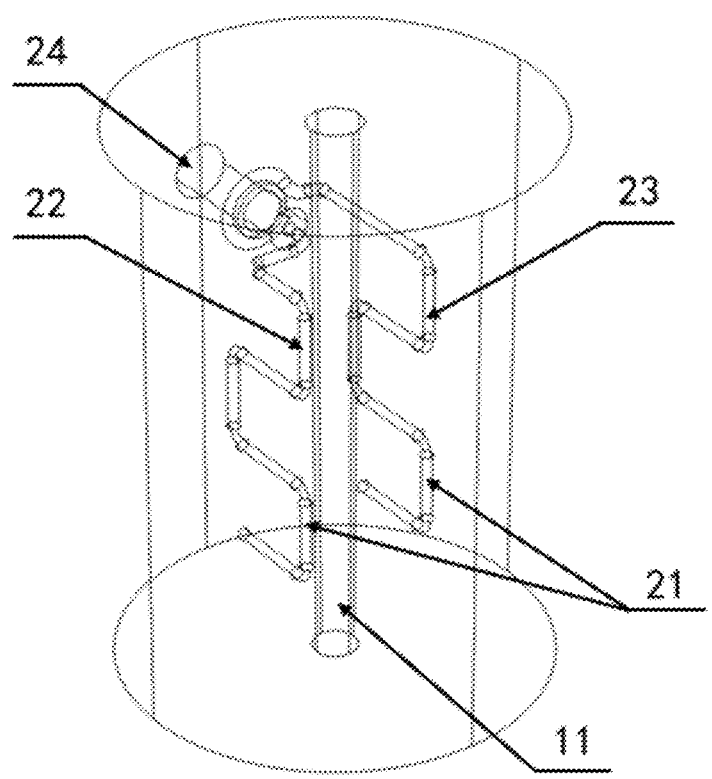

In FIG. 5, the anode antenna 22 and the cathode antenna 23 in the microwave heating antenna are spirally arranged and the electric field generated in such arrangement manner is relatively more concentrated near the extrusion nozzle 11 than the other manners. The spiral arrangement is not limited only to the form shown in FIG. 5. Parameters such as the diameter and screw pitch of the spiral structure formed by the anode antenna 22 and the cathode antenna 23 are set based on the requirement of the output energy.

A location of the spirally arranged microwave antennas 21 is determined based on the location of the extrusion nozzle 11. Usually, the center axis of the extrusion nozzle 11 coincides with the center axis of the spiral structure formed by the anode antenna 22 and the cathode antenna 23.

The anode antenna 22 and the cathode antenna 23 in the spiral arrangement manner are made of the metal that has conductivity but has no wave-absorbing capability.

In FIG. 6 to FIG. 10, the anode antenna 22 and the cathode antenna 23 in the heating antenna 21 are symmetrically arranged on both sides using metal wires, and this arrangement manner is easy to make compare to other manners. The symmetrical arrangement on both sides is not limited only to the form shown in FIG. 6 to FIG. 10. The size and shape of the anode antenna 22 and the cathode antenna 23 are set based on the requirement of the output energy.

The location of the microwave antennas 21 symmetrically arranged on both sides is determined based on the location of the extrusion nozzle 11. Usually, the vertical axis of the extrusion nozzle 11 is located at the center between the anode antenna 22 and the cathode antenna 23.

The anode antenna 22 and the cathode antenna 23 in the symmetrical arrangement manner are made of metal that has conductivity but has no wave-absorbing capability.

Figure 11:
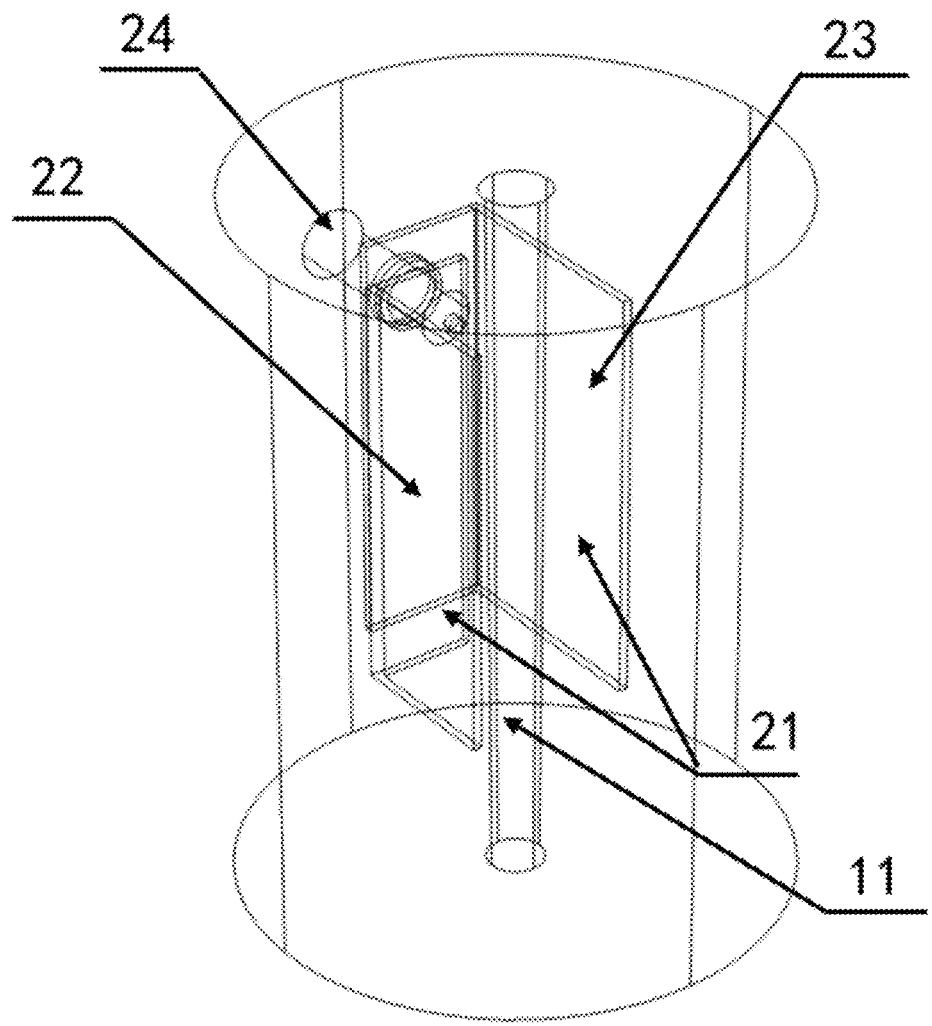

In FIG. 11, the anode antenna 22 and the cathode antenna 23 in the microwave antenna are symmetrically arranged on both sides using electrode plates, and the electric field generated in such arrangement manner has relatively higher stability. The arrangement manner using electrode plates is not limited only to the form shown in FIG. 11. Parameters such as shapes, thicknesses, and sizes of the electrode plates used by the anode antenna 22 and the cathode antenna 23 are set based on the requirement of output energy.

The location of the microwave antennas 21 arranged using electrode plates is determined based on the location of the extrusion nozzle 11. Usually, the center axis of the extrusion nozzle 11 is located at the symmetry center of the two electrode plates of the anode antenna 22 and the cathode antenna 23.

The anode antenna 22 and the cathode antenna 23 in the symmetrical arrangement manner on the two sides using the electrode plates are made of the metal that has conductivity and has no wave-absorbing capability.

To obtain temperature of the material extruded from the extrusion nozzle 11 of the microwave-coupled 3D printing equipment for food, a temperature sensor 27 is further disposed at the outlet of the extrusion nozzle 11 in this application. The information of temperature is transmitted by using a temperature sensing wire 28 to the control unit to determine whether the temperature meets a related requirement.

The temperature sensor 27 is located at the metal wall of the bottom surface of the microwave cavity 20, and the top end of the it is in close contact with the wall of the end of the extrusion nozzle 11.

The microwave-coupled 3D printing equipment for food further includes the printing platform, microwave leakage prevention unit and a 3D driver unit controlling movement of the charging barrel 10. For some general setting components required for microwave-coupled 3D printing, refer to related settings in the patent application with the application number 201910089465.1. For example, in the microwave-coupled 3D printing system for food shown in FIG. 12, the X-axis guide rail 6 and Z-axis guide rail 8 that control movement of the charging barrel 10 and a Y-axis guide rail 7 controlling movement of the printing platform 9. Details are not described in this application.

Example 2

This embodiment provides an integrated microwave-coupled 3D printing system for food design and production.

Figure 12:
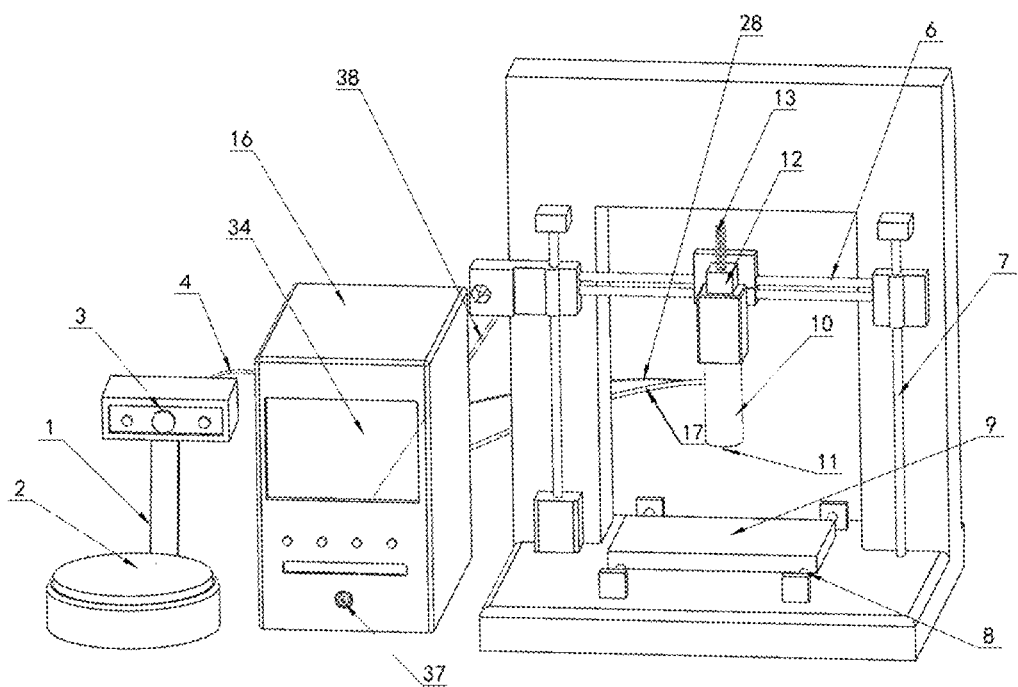
FIG. 12 is a schematic composition diagram of the microwave-coupled 3D printing system for food according to the present invention.
Figure 13:
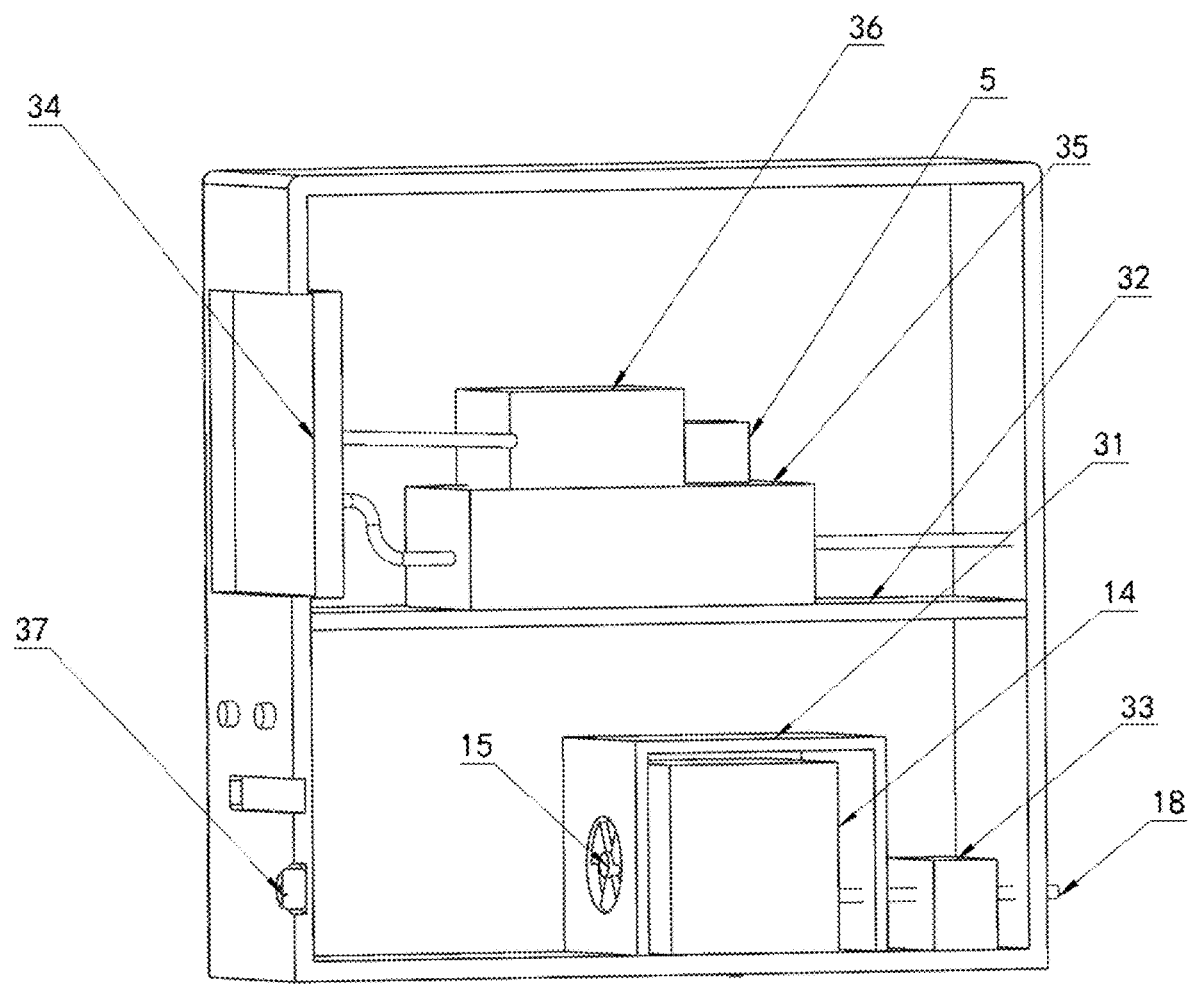
FIG. 13 is a schematic composition diagram in Integrated component case of a microwave-coupled 3D printing system for food according to the present invention, where a 3D scanner 1 (an article placing table 2, a camera 3, and a signal transmission line 4) and an image signal converter 5 are included; the 3D printing unit includes: an X-axis guide rail 6, a Y-axis guide rail 7, a Z-axis guide rail 8, a printing platform 9, a charging barrel 10, an extrusion nozzle 11, a stepper motor 12, and an extrusion screw 13; the focused heating unit includes a microwave generator 14, a cooling fan 15, a cabinet 16, a microwave transmission line 17, a first microwave adapter 18, a second microwave adapter 19, a microwave cavity 20, a microwave heating antenna 21, an anode antenna 22, a cathode antenna 23, a coaxial line 24, the internal conductor 25 and the external conductor 26 of the coaxial line, a temperature sensor 27, a temperature sensing wire 28, a material inlet 29, and a material outlet 30; the leakage prevention unit includes a metal wall 31, a cabinet isolation plate 32, and a circulator 33; and the control unit includes a control screen 34, an integrated circuit 35, a 3D printing extrusion instruction controller 36, a switch button 37, and a 3D printing signal output wire 38.
Figure 14A:
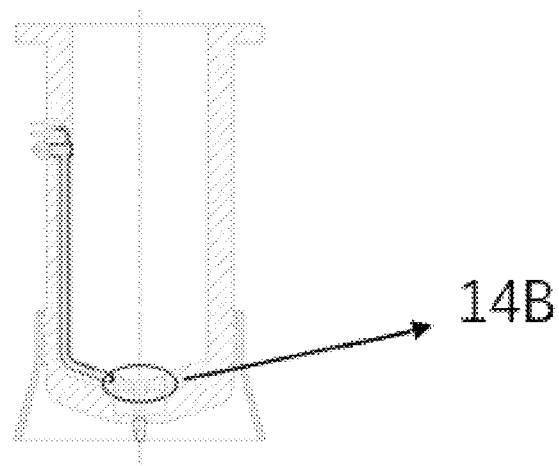
FIG. 14A-D is a simulation diagram when a value d is 2 mm in a heating mode of the application entitled A THREE-DIMENSIONAL PRINTER COUPLED WITH MICROWAVE AND PRINTING METHOD APPLIED FOR FOOD DESIGN with the application number of CN 201910089465.1 (conditions: microwave power is 60 W, flow rate of materials at inlet end of the extrusion nozzle is 0.01 m/s, and the maximum value of legends of electric field is uniformly 10000 V/m).
Figure 14B:
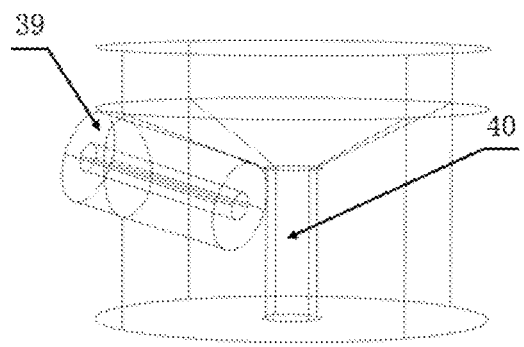
Figure 14C:
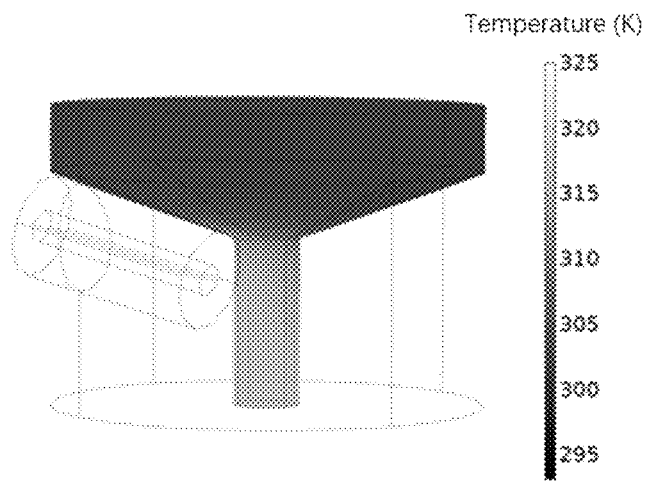
Figure 14D:
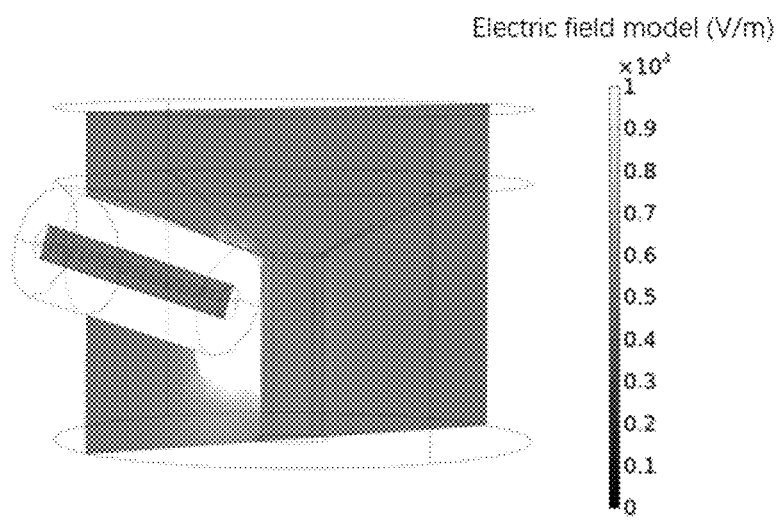

As shown in FIG. 12 and FIG. 13, the microwave-coupled 3D printing system has an image processing function integrating scanning and imaging, image processing and slicing processing. The integrated microwave-coupled 3D printing system for food includes: a scanning and imaging unit, a control unit, a focused microwave heating unit, a 3D printing unit, and a leakage prevention unit.

The microwave-coupled 3D printing system for food design and production obtains image information of the target object by using the scanning and imaging unit. Then, the image information is send to the control unit. The control unit performs slicing processing on the image of the target object by using Cura, and sends the corresponding instruction to the 3D printing unit to complete printing. In addition, corresponding microwave power is set by using the control unit, so that the heating processing is completed by the focused microwave heating unit.

For example, when a 3D printed product in an animal shape needs to be printed by using surimi, the scanning and imaging unit will scan an existing object in the animal shape (such as a toy model), and then the scanning and imaging unit will send the obtained image information of the animal shape to the control unit. Alternatively, 3D modeling can be directly performed by using computer software to obtain a corresponding animal shape, and image information of the animal shape is sent to the control unit. This is not limited in this application.

Components of the microwave-coupled 3D printing system for food design and production are described in detail below. For related description of the focused microwave heating unit and the 3D printing unit, refer to the description in Embodiment 1. The information of temperature measured by a temperature sensor 27 disposed at the outlet of the extrusion nozzle 11 is transmitted to the control unit by using a temperature sensing wire 28 and is displayed on a control screen 34. So that the operator can adjust output power of the microwave source 14 in real time based on the information of temperature.

As shown in FIG. 12, the scanning and imaging unit includes a 3D scanner 1 and an image signal converter 5. The 3D scanner 1 includes an article placing table 2, a camera 3, and a signal transmission line 4.

The scanning and imaging unit obtain the image information of the target object by using the 3D scanner 1, to obtain. The image information is imported into the image signal converter 5 by using the signal transmission line 4. The signal converter 5 has a function of converting the image information to a file of stl type, and sends the file of stl type to the control unit. Software Cura is built in the control unit, and may perform slicing processing on the stl file.

The control unit includes a control screen 34, an integrated circuit 35, a 3D printing extrusion instruction controller 36, a switch button 37, and a 3D printing signal transmission line 38.

The 3D printing extrusion instruction controller 36 controls on and off of the microwave source 14 and power based on an extrusion instruction generated by the slicing software Cura. When receiving the extrusion instruction G1 Ex (which indicates that the extrusion distance is x mm), the extrusion instruction controller 36 controls the microwave source 14 to output a microwave. When the extrusion instruction disappears, that is, no material is extruded, the extrusion instruction controller 36 controls the microwave source 14 to stop outputting.

The operator may control the integrated circuit 35 in real time by using the control screen 34, so as to control the power of the microwave source 14, Cura slicing parameter, and switch program of a 3D printer. The signal transmission line 38 is connected to the integrated circuit 35 and the 3D printing unit, to transmit the 3D printing unit movement instruction. The focused microwave heating unit includes the microwave source 14, the cooling fan 15, the cabinet 16, the microwave transmission line 17, the first microwave adapter 18, the second microwave adapter 19, the microwave cavity 20, the microwave heating antenna 21 (including the anode antenna 22 and the cathode antenna 23), the coaxial line 24 (including an internal conductor 25 of the coaxial line and an external conductor 26 of the coaxial line), and the temperature sensor 27, the temperature sensing wire 28, the material inlet 29, and the material outlet 30;

The 3D printing unit includes: the X-axis guide rail 6, the Y-axis guide rail 7, the Z-axis guide rail 8, the printing platform 9, the charging barrel 10, the extrusion nozzle 11, the stepper motor 12, and the extrusion screw 13. The microwave heating cavity 20 and the charging barrel 10 that are integrated are located on the X-axis guide rail 6, and two ends of the X-axis guide rail 6 are located on two sides of the Z-axis guide rail 8. The X-axis guide rail 6 coordinates with the Z-axis guide rail 8 to complete printing of materials in an X direction and a Z direction. The Y-axis guide rail 7 controls the relative location of the printing platform 9.

The 3D printing unit controls the movement of the X-axis guide rail 6, the Y-axis guide rail 7, and the Z-axis guide rail 8 based on the received 3D printing unit movement instruction, and controls the stepper motor 12 to push the extrusion screw 13 to extrude the material.

The leakage prevention unit includes: a cooling fan 15, a metal wall 31, a cabinet isolation plate 32, and a circulator 33.

The metal wall 31 forms a metal cavity to wrap the microwave generator 14 inside, to effectively prevent the microwave leakage of the microwave generator 14. The cooling fan 15 is located on the metal wall 31, to effectively cool the microwave source 14. The microwave generator is isolated from the other electrical elements by the cabinet isolation plate 32 to further prevent a microwave from damaging the another electrical element. The circulator 33 is located between the output end of the microwave source 14 and the first microwave adapter 18, so that damage caused by a reflected microwave to the microwave generator can be effectively prevented.

As shown in FIG. 12, the materials enter from the material inlet 29 located at the upper portion of the microwave cavity 20 to the extrusion nozzle 11, and arrives at the external portion of the microwave heating cavity 20 through the material outlet 31. The materials in the charging barrel 10 is extruded by the extrusion screw 13, passes through the extrusion nozzle 11, heated by the microwave heating antenna 21 in the microwave heating cavity 20, and then deposited on the printing platform 9.

Example 3

This embodiment provides a microwave-coupled 3D printing method for food design and production, applied to the microwave-coupled 3D printing system in Embodiment 2. The method includes:
switching on the cabinet switch button 37, and adding an appropriate quantity of food slurries into a charging barrel 10;
the target object is placed on the article placing table 2 of the 3D scanner 1 and scanned to get the image information which will be transmitted to the image signal converter 5 by using a signal transmission line 4, and the image information will be transformed to stl file by the image signal converter 5; or if there is no target object, directly importing the image file of the target object into the image signal converter 5 through a USB interface, and automatically converting, by the image signal converter 5, the target file to the stl format;

according to the appropriate printing parameter, performing slicing processing on the stl image file through the control screen 34 by using built-in software Cura according to the appropriate printing parameter; and setting appropriate microwave power by using the control screen 34 and clicking the start button. The control instruction will be transmitted to the 3D printer through the signal transmission line 38 to control the 3D printing process and transmitted to the 3D printing extrusion instruction controller through the circuit board. The microwave will be enabled when the material is extruded and disabled when the material is not extruded, thereby avoiding excessive heating and achieving heating uniformity for the products.

During printing, the microwave generated by the microwave generator 14 goes through the first microwave adapter 18 and the microwave transmission line 17 in turn, and is introduced into the microwave heating antenna 21 through the second microwave adapter 19 on the wall of the microwave cavity 20. The microwave will be limited between the anode antenna 22 and the cathode antenna 23 by the two antennas, to achieve focused heating on the materials continuously extruded from an extrusion nozzle 11.

Therefore, temperature of the materials which flow in the extrusion nozzle 11 gradually increases in the process of performing extrusion from top to bottom. When the material is just extruded, the materials reach the temperature required for solidify and solidify occurs. In addition, because the materials in the extrusion nozzle 11 which dose not reach the solidified temperature is still in a flowing state, so that the materials can be extruded normally.

During printing, the X-axis guide 6 and Z-axis guide 8 control the relative location of the charging barrel 10, and the Y-axis guide 7 controls a relative location of the printing platform 9. A stepper motor 12 controls an extrusion screw 13 to extrude the material in the charging barrel 10. The material is deposited on the printing platform 9 after passing through the extrusion nozzle 11.

When one layer is to be printed, the axis Z remains unchanged, an axis X and axis Y move based on a program, the stepper motor controls the extrusion screw 13 to extrude the material, and the material in the extrusion nozzle 11 is heated by the microwave heating antenna 21, and is deposited on the printing platform 9 after being extruded.

After printing one layer of material is completed, the charging barrel 10 rises to a height along the axis Z for printing of a next layer. Because the microwave heating antenna 21 is fixed on the charging barrel 10, the microwave heating antenna also rises to a height, to heat the next layer of extruded material.

After the printing is completed, each component returns to the origin, and the printing is completed.

The present invention provides a microwave-coupled 3D printing system and equipment for food design and production, to greatly improve feasibility of 3D printing of food materials with high-moisture content. A bipolar microwave heating antenna is disposed, to implement focused heating on the material in an extrusion nozzle. In addition, the bipolar microwave heating antenna breaks through traditional multi-mode cavity heating manners, thereby greatly reducing a heating cavity volume and facilitating integration with a desktop 3D printer. A microwave switch is controlled by using an extrusion instruction to achieve synchronization between extrusion and heating, and improve heating uniformity. Through joint operations of a 3D scanner, slicing software, and a 3D printer, processes of model making, slicing, and 3D printing are integrated. The microwave-coupled 3D printing system and equipment for food design and production provided by the present invention can quickly heat the material in the extrusion nozzle in a focused heating manner, to instantly cure the extruded material. So that the extruded material has high mechanical strength, thereby improving modeling quality of a printed product, and effectively resolving a problem of deformation, collapse, and the like of the printed product.

In order to prove beneficial effects of the microwave-coupled 3D printing system and equipment for food design and production provided in this application, as shown in FIG. 14A-D, FIG. 15A-B, FIG. 16A-C and FIG. 17A-C. Finite element simulation comparison is performed to verify the difference between the heating effects of MICROWAVE-COUPLED 3D PRINTING METHOD AND HEATING COMPONENT OF PRINTER with the application number of 201910089465.1 and the 3D printing equipment provided in the present invention.

In the MICROWAVE-COUPLED 3D PRINTING METHOD AND PRINTER FOR FOOD with the application number of 201910089465.1, the combination of a microwave heating probe 39 built in an inner wall of a charging barrel releases a microwave at a front end Initial temperature of a raw material and the size settings of a non-wave-absorbing material achieve an effect of instantly heating and gelling an extruded material. The microwave heating probe used includes a coaxial line and is reflected as a single columnar structure. For this equipment, a distance between the microwave heating probe and an extrusion head needs to be calculated based on a dielectric property of the materials. The heating probe needs to be replaced when different materials are to be printed.

Same material parameters are used during simulation: A relative dielectric constant is 70, a dielectric loss is 55, a heat conductivity coefficient is 0.577 W/(m-K), magnetic conductivity is 1, and initial temperature is 293.15 K. Simulation conditions are as follows: Microwave power is 60 W, a flow rate of the extruded material is 0.01 m/s, a maximum value of legends of an electric field is uniformly 10000 V/m, and an acceptable microwave reflection loss is −6. In this case, it is determined based on a microwave reflection loss formula that the distance d between the microwave heating probe 39 and the extrusion head 40 is 2 mm or 4 mm.

As shown in FIG. 14A-D, in this case, when it is determined, based on the microwave reflection loss formula, that the distance d between the microwave heating probe 39 and the extrusion head 40 is 2 mm, temperature of the material in the extrusion head is raised from initial temperature of 293.15 K to about 325 K. The electric field is mainly concentrated at the front end of the microwave heating probe 39, and the extrusion head 40 has poor heating effects. Since the distance between the microwave heating probe 39, the extrusion head 40, and a material at an upper end is relatively short, most of materials in the figure have a relatively strong electric field.

Figure 15A:
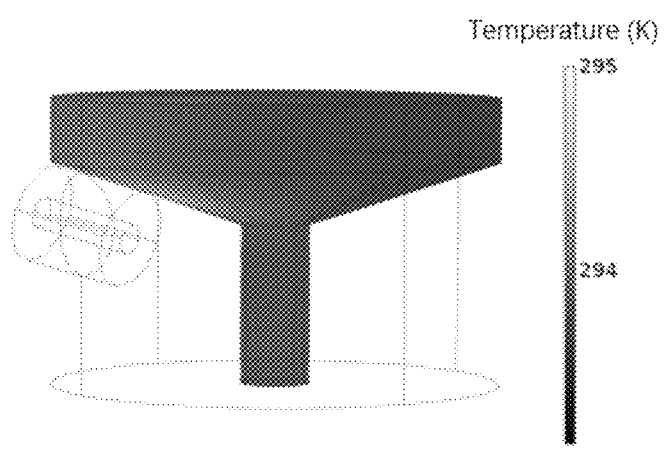
FIG. 15A-B is a simulation diagram when a value d is 4 mm in a heating mode of the application entitled A THREE-DIMENSIONAL PRINTER COUPLED WITH MICROWAVE AND PRINTING METHOD APPLIED FOR FOOD DESIGN with the application number of CN 201910089465.1 (conditions: microwave power of is 60 W, a flow rate of a materials at an inlet end of an the extrusion nozzle is 0.01 m/s, and a the maximum value of legends of an electric field is uniformly 10000 V/m).
Figure 15B:
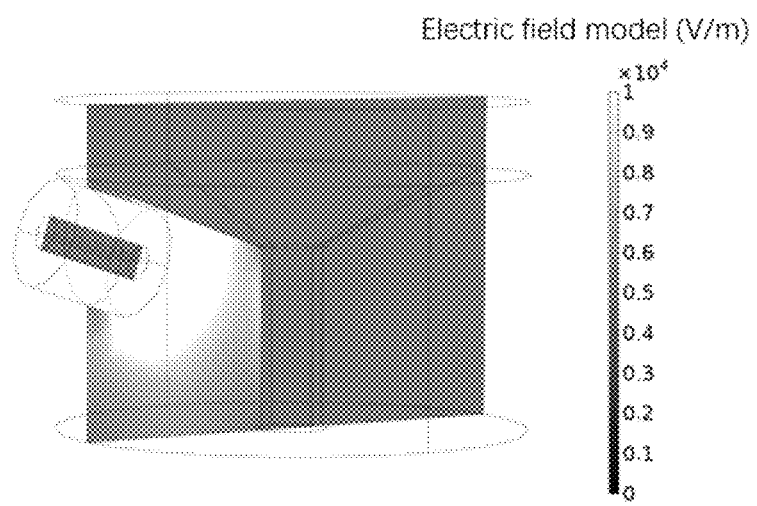

As shown in FIG. 15A-B, in this case, when it is not determined, based on the microwave reflection loss formula, that the distance d between the microwave heating probe 39 and the extrusion head 40 is 4 mm. An inconspicuous heating effect is shown that temperature of the material in the extrusion head is raised from initial temperature of 293.15 K to about 295 K. The electric field is concentrated at the front end of the microwave heating probe 39, and the extrusion head 40 has poor heating effects. Since the distance between the microwave heating probe 39 and the extrusion head 40 is relatively long, electric field around the material in the extrusion head is relatively weak, and only a material close to the microwave heating probe 39 has a certain electric field.

As shown in FIG. 16A-C and FIG. 17A-C, heating structures in each figure have a microwave heating cavity 20, an extrusion nozzle 11, and a coaxial line 24 that are of a same size. Heating is directly performed in FIG. 16A-C by using the coaxial line 24, and no bipolar microwave heating antenna is designed. Heating is performed in FIG. 17A-C by using spirally arranged microwave heating antennas 21 in the present invention.

Figure 16A:
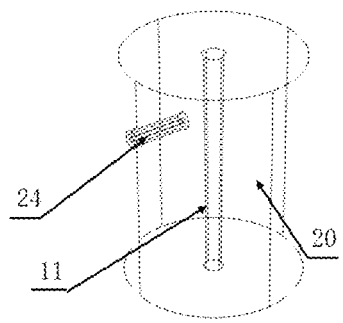
FIG. 16A-C is a simulation diagram of heating mode that used a same microwave cavity as the present invention, but performing heating by using only a coaxial line (conditions: microwave power of is 60 W, a flow rate of a materials at an inlet end of an the extrusion nozzle is 0.01 m/s, and a the maximum value of legends of an electric field is uniformly 10000 V/m).
Figure 16B:
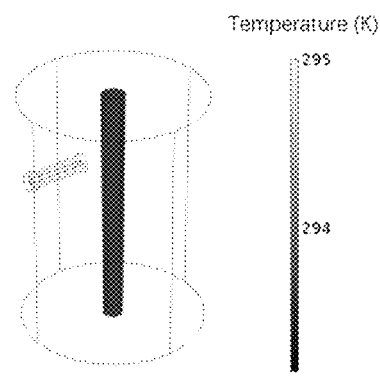
Figure 16C:
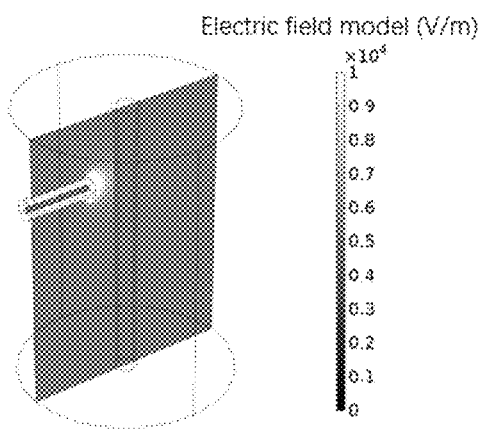

As shown in FIG. 16A-C, inlet temperature of a material in the extrusion nozzle 11 is 293.15 K, and outlet temperature is 295 K. The electric field is concentrated at a front end of the coaxial line 24, and the electric field near the extrusion nozzle 11 is weak.

Figure 17A:
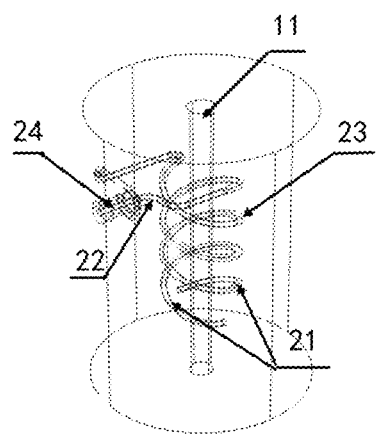
FIG. 17A-C is a simulation diagram of spirally arranged microwave heating antennas according to the present invention (conditions: microwave power is 60 W, flow rate of materials at inlet end of the extrusion nozzle is 0.01 m/s, and the maximum value of legends of electric field is uniformly 10000 V/m).
Figure 17B:
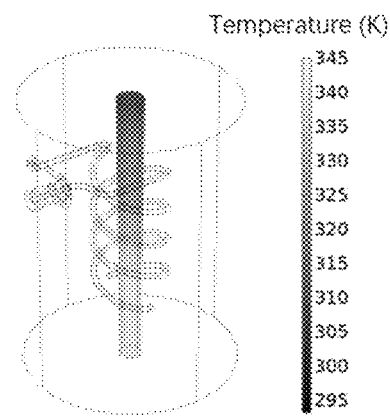
Figure 17C:
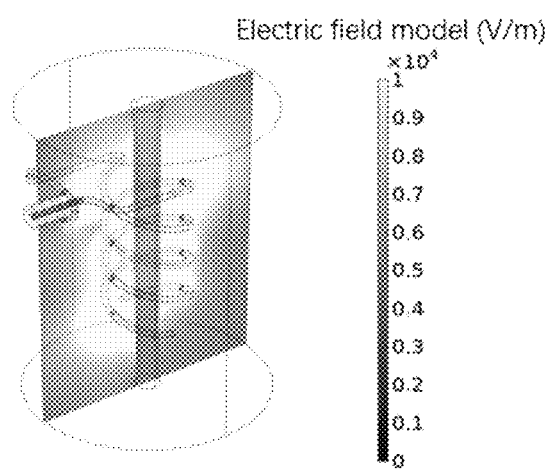

As shown in FIG. 17A-C, inlet temperature of the extrusion nozzle is 293.15 K and outlet temperature is 345 K. Compared with the other three manners shown in FIG. 14A-D, FIG. 15A-B and FIG. 16A-C, the temperature rise is obvious. The electric field is distributed between the anode antenna 22 and the cathode antenna 23. Since the extrusion nozzle 11 is surrounded by the microwave heating antenna 21, there is also a strong electric field near the extrusion nozzle 11.

As shown in FIG. 14A-D, FIG. 15A-B, FIG. 16A-C and FIG. 17A-C, a bipolar microwave heating antenna is used to enable the electric field to concentrate around the extrusion nozzle, so that a rise in the temperature of the material in the extrusion nozzle is more obvious. Compared to that in FIG. 14A-D, FIG. 15A-B and FIG. 16A-C, a heating manner of the bipolar microwave heating antenna can expand the electric fields limited around the microwave heating probe 39 and the coaxial line 24, so that the electric field near the extrusion nozzle 11 is more concentrated and is stronger.

In order to further describe that use of the bipolar microwave heating antenna can make the rise in the temperature of the material in the extrusion nozzle more obvious, a surimi material is specially used to conduct an experiment. A measured value of the temperature sensor 27 at an outlet of the extrusion nozzle is measured in an experimental process at a same material extrusion rate and different microwave power.

The surimi parameters are as follows: A relative dielectric constant is 70, a dielectric loss is 55, a heat conductivity coefficient is 0.577 W/(m-K), magnetic permeability is 1, and initial temperature is 20° C. When it is calculated according to the above parameters that a distance d between the microwave heating antenna 39 and the extrusion head is 6 mm, as shown in the following Table 1 to Table 3, power and values corresponding to temperature of the bipolar microwave heating antennas arranged using spiral antennas, symmetrical antennas, and symmetrical electrode plates. A flow rate of a material at an inlet of the extrusion nozzle 11 is selected to be 0.01 m/s, which is an extrusion rate when a printing effect is relatively desirable in the present invention and current research on much 3D printed food. It can be seen that different heating effects can be obtained by adjusting the microwave power in the present invention. Greater power leads to higher heating temperature.

TABLE 1

Temperature measured by the temperature sensor 27 at a same extrusion rate and different power using spirally arranged bipolar microwave heating antennas (due to limited nature of food materials, only temperature of a material reaching about 100° C. is measured)

| Power/W | Temperature of a temperature probe/° C. |
|---|---|
| 0 | 20 |
| 10 | 25 |
| 20 | 38 |
| 30 | 44 |
| 40 | 55 |
| 50 | 65 |
| 60 | 70 |
| 70 | 82 |
| 80 | 90 |

TABLE 2

Temperature measured by the temperature sensor 27 at a same extrusion rate and different power using symmetrical bipolar microwave heating antennas (due to limited nature of food materials, only temperature of a material reaching about 100° C. is measured)

| Power/W | Temperature of a temperature probe/° C. |
|---|---|
| 0 | 20 |
| 10 | 24 |
| 20 | 30 |
| 30 | 41 |
| 40 | 49 |
| 50 | 52 |
| 60 | 63 |
| 70 | 70 |
| 80 | 81 |

TABLE 3

Temperature measured by the temperature sensor 27 at a same extrusion rate and different power using bipolar microwave heating antennas of electrode plates (due to limited nature of food materials, only temperature of a material reaching about 100° C. is measured)

| Power/W | Temperature of a temperature probe/° C. |
|---|---|
| 0 | 20 |
| 10 | 27 |
| 20 | 35 |
| 30 | 47 |
| 40 | 59 |
| 50 | 66 |
| 60 | 77 |
| 70 | 86 |
| 80 | 95 |

Some steps in the embodiments of the present invention may be implemented by software, and a corresponding software program may be stored in a readable storage medium, such as an optical disc or a hard disk.

What is claimed is:

1. Microwave-coupled 3D printing equipment comprising a focused microwave heating unit and a material extrusion unit, wherein
the focused microwave heating unit comprises a microwave heating cavity and a microwave heating antenna, wherein the microwave heating antenna is a bipolar antenna, and comprises an anode antenna and a cathode antenna, and the anode antenna and the cathode antenna are disposed inside the microwave heating cavity; and the material extrusion unit comprises a charging barrel and an extrusion nozzle; the anode antenna and the cathode antenna are disposed on opposite sides of the extrusion nozzle, and the anode antenna and the cathode antenna are configured to limit a microwave electric field between the anode antenna and the cathode antenna, thereby implementing focused heating on a material in the extrusion nozzle.

2. The microwave-coupled 3D printing equipment according to claim 1, wherein the anode antenna and the cathode antenna are bilaterally symmetrical with respect to each other or wherein the anode antenna and the cathode antenna are spirally arranged around the extrusion nozzle.

3. The microwave-coupled 3D printing equipment according to claim 2, wherein the anode antenna and the cathode antenna are metal wires or plates.

4. The microwave-coupled 3D printing equipment according to claim 1, further comprising a coaxial line, wherein the anode antenna and the cathode antenna are respectively connected to an internal conductor and an external conductor of the coaxial line.

5. The microwave-coupled 3D printing equipment according to claim 1, wherein the anode antenna and the cathode antenna are made of metal that has conductivity but has no wave-absorbing capability.

6. The microwave-coupled 3D printing equipment according to claim 1, further comprising a stepper motor, an extrusion screw, an X-axis guide rail, a Y-axis guide rail, a Z-axis guide rail, and a printing platform, wherein the charging barrel is movable along the X-axis guide rai land Y-axis guide rail, and the printing platform is movable along the Z-axis guide rail; wherein the stepper motor is configured to turn the extrusion screw, thereby pushing the material out from the extrusion nozzle.

* * * * *